US007173356B2

(12) United States Patent
Krueger et al.

(10) Patent No.: US 7,173,356 B2
(45) Date of Patent: Feb. 6, 2007

(54) INDEPENDENT DIRECT DRIVE FOR PAPER PROCESSING MACHINES

(75) Inventors: Michael Krueger, Edingen-Neckarhausen (DE); Martin Riese, Radebeul (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/242,197

(22) Filed: Sep. 12, 2002

(65) Prior Publication Data

US 2003/0056666 A1 Mar. 27, 2003

(30) Foreign Application Priority Data

Sep. 21, 2001 (DE) ................................ 101 46 644

(51) Int. Cl.
*B41F 13/008* (2006.01)
*B41F 13/004* (2006.01)
*B41F 33/08* (2006.01)
*H02K 23/60* (2006.01)
*H02K 47/00* (2006.01)

(52) U.S. Cl. ...................... 310/112; 101/216; 101/248; 310/113; 310/115; 310/67 R

(58) Field of Classification Search ................ 310/115, 310/118, 120–122, 103; 226/108, 188; 101/216–218, 101/247–248, 480; 198/788
See application file for complete search history.

(56) References Cited

U.S. PATENT DOCUMENTS 469,193 A * 2/1892 Byllesby ..................... 310/115
516,916 A * 3/1894 Coleman ..................... 105/52
1,983,896 A * 12/1934 Bottcher ..................... 318/730
3,557,692 A * 1/1971 Lee ............................ 101/177
3,608,799 A * 9/1971 Edson ......................... 226/31
4,381,707 A * 5/1983 Klaus et al. ................ 101/282
4,527,788 A * 7/1985 Masuda ..................... 270/21.1
4,812,842 A * 3/1989 Bayerlein et al. ...... 340/825.72
5,115,738 A * 5/1992 Grutzmacher et al. ...... 101/216
5,438,496 A * 8/1995 Meur et al. .................... 363/16
5,524,805 A 6/1996 Shiba et al. ................ 226/108
5,704,288 A * 1/1998 John ........................... 101/216
5,727,749 A * 3/1998 Pensavecchia et al. .. 242/538.3
5,771,805 A * 6/1998 Branas et al. ............... 101/248
5,826,505 A 10/1998 Volz et al. .................. 101/183
5,953,991 A * 9/1999 Geissenberger et al. .... 101/218
6,118,195 A 9/2000 Hauer ......................... 310/75
6,178,884 B1 * 1/2001 Weschenfelder ............ 101/247
6,247,407 B1 * 6/2001 Hartmann et al. .......... 101/480
6,408,748 B1 * 6/2002 Hajek et al. ................ 101/177

(Continued)

FOREIGN PATENT DOCUMENTS

DE 3919291 12/1989

(Continued)

*Primary Examiner*—Burton Mullins
(74) *Attorney, Agent, or Firm*—Davidson, Davidson & Kappel, LLC

(57) ABSTRACT

The present invention provides an electric drive, including a stator (4) and a rotor (3), for a paper processing machine, in particular a printing press having at least two rotary subassemblies (1, 2), the stator (4) and the rotor (3) being separated from one another by an air gap. This electric drive is distinguished in that the one subassembly (1) contains the rotor (3) and the other subassembly (2) the stator (4).

8 Claims, 2 Drawing Sheets

U.S. PATENT DOCUMENTS 6,420,807 B1 * 7/2002 Tsujimoto et al. ............ 310/83

FOREIGN PATENT DOCUMENTS

| | | |
|---|---|---|
| DE | 4022735 | 1/1991 |
| DE | 29619491 | 2/1997 |
| DE | 19930998 | 2/2000 |
| EP | 0812683 | 12/1997 |
| GB | 2283939 | 5/1995 |

* cited by examiner

INDEPENDENT DIRECT DRIVE FOR PAPER PROCESSING MACHINES

Priority to German Patent Application 101 46 644.7, filed Sep. 21, 2001 and hereby incorporated by reference herein, is respectfully requested.

BACKGROUND OF THE INVENTION

The present invention is directed to an electric drive for paper processing machines having at least two rotary subassemblies.

From the German Patent Application No. 199 30 998 A1, a printing press drive is known which is designed as an external-rotor motor. Its rotor is equipped with permanent magnets and is assigned to at least one cylinder of the printing press as its drive, with the stator being in a fixed connection with the side frame of the printing press. In addition, on its exterior, the rotor has a ring gear by way of which it contacts other gear wheels of a gear train of the printing press. In this manner, at least one cylinder of the printing press is directly driven and is, nevertheless, in contact via one gear train with other cylinders of the printing press and their drive. In this manner, as well, the cylinder and its drive are synchronized with other drives and cylinders of the printing press. To connect the rotor to the gear train, the ring gear can be rotationally mounted on the rotor. This enables the ring gear to be rotated with respect to the rotor to enable angular adjustments of the cylinder to be made with respect to the gear train.

In addition, from European Patent No. 0 812 683 B1, a drive for a sheet-fed offset press is known. In this case, the cylinders or drums or one or more print units are interconnected via a gear train and driven by at least one drive acting on this gear train. Moreover, in each print unit, there is at least one plate cylinder or blanket cylinder which is mechanically decoupled from the gear train and is driven by an assigned drive, as the case may be, in a specifiable manner. Thus, in the context of such a sheet-fed offset press, some drums and cylinders are constantly driven by a gear train, while other cylinders are driven by a separate drive. As a general principle, the latter components are not connected to the continuous gear train.

The drawback of the approach according to German Patent Application 199 30 998 A1 is that the cylinders of a printing press are in continuous contact with the gear train of the printing press, so that it is not possible to vary the rotational speed or the direction of rotation of the individual cylinders. It may be that the other approach known from European Patent No. 0 812 683 B1 does allow a cylinder-specific drive, but its disadvantage is that the individually driven cylinders are not connected to a gear train. This, in any case, necessitates a costly electronic synchronization of the cylinders.

It is also known to connect cylinders on one side to a gear train and, on the other side, to a direct drive. In such a case, the cylinders are connected via a coupling to the gear train. The significant disadvantage here, however, is that a mechanical or electromagnetic coupling must be provided, which takes up space and entails costs.

BRIEF SUMMARY OF THE INVENTION

An object of the present invention is to devise a drive for paper-processing machines which is designed as a direct drive for individual rotating components and which, in addition, offers the possibility of connecting the individually-driven rotating components via a common gear train, without the need for a coupling. It is, moreover, an object of the present invention to devise a way for the already existing electric drive motors of a printing press to be useful for the case when they are not executing motive functions at the particular moment.

The present invention provides an electric drive, including a stator (4) and a rotor (3), for a paper processing machine, in particular a printing press, comprising at least two rotary subassemblies (1, 2), the stator (4) and the rotor (3) being separated from one another by an air gap, wherein the one subassembly (1) contains the rotor (3) and the other subassembly (2) the stator (4).

The present invention takes advantage of the fact that the components of an electromotor, i.e., the stator and rotor, are rotatable with respect to one another in the deenergized state. In this case, a certain force or energy must, in fact, be applied in order to rotate the stator oppositely to the rotor. However, this does result in electrical energy being generated on the other side which, in turn, may be fed back into the power supply system. The electromotor is thus used, on the one hand, as a coupling between two rotary subassemblies. On the other hand, it also serves the purpose of a normal drive for setting one of the two subassemblies in rotation. If it is intended for both subassemblies to be driven in different ways, then two drive motors are needed, in any case, so that the electric drive in accordance with the present invention enables one to economize on a coupling. The result is that the wear attributable to a coupling is effectively eliminated. In addition, it is possible that two subassemblies of a paper-processing machine are continually coupled by a motor, but, nevertheless, may be operated completely independently from one another. Besides applications in folding machines, this is particularly advantageous for applications in printing presses. The subassemblies of a printing press may include cylinders, a gear wheel, or a complete gear train, a roller, or some other rotary component required for printing or paper handling. Depending on how the motor connecting the two subassemblies is driven, various rotary configurations are possible. Thus, one subassembly, e.g., a gear train, may rotate in one direction of rotation, while the other subassembly, e.g., an impression cylinder, is able to rotate in the other direction. In this case, the rotational speed of the gear train is controlled by an additional motor which drives the gear train. The rotational speed of the driven cylinder is derived then from the difference between the rotational speed of the motor between the two subassemblies and the rotational speed of the gear train. One of the two subassemblies may also be easily stopped, with the result that only one subassembly still rotates. It is particularly useful, for example, to stop operation of the gear train and to only allow the cylinder to rotate. In this case, then, the rotor is at a standstill, while the stator rotates. This rotary configuration is only possible because of the additional degree of freedom attained due to the fact that the stator is likewise rotationally mounted by way of the subassembly of the rotary cylinder.

If one of the subassemblies is driven by another electric drive, then substantial benefit is derived in that an entire print unit may be driven via one single motor, namely the other electric drive. Thus, it is easily possible for both the one subassembly, the gear train, as well as the other subassembly, the driven cylinder, to be driven synchronously. Therefore, the electric drive between the two subassemblies only needs then to supply motive power, when this is absolutely necessary. Besides motive assistance, the additional electric drive however also may function dynamically or regeneratively, e.g., as a braking drive used in printing presses to ensure that the individual gear-wheel flanks of a gear train always stay in contact with the same flanks.

If one of the subassemblies is stoppable by a brake or pawl, then it is possible to optionally drive, via one single electric drive, either the one subassembly, the cylinder, or the other subassembly, the gear train, using one single motor. If the cylinder is stopped by a pawl or brake, then the gear train may be driven by the drive according to the present invention. If, on the other hand, the gear train is stopped by a pawl or brake, then the motor drives the cylinder. Thus, in the first version, the motor may drive an entire print unit, while, in the second version, it drives a single cylinder. This substantially enhances the flexibility in a print unit.

If the stator is likewise able to rotate, then a current supply must be provided to make possible such a rotary stator. For purposes of the current supply, the stator is provided with an additional air gap on the side facing away from the rotor. A current supply via an air gap is characterized by an especially low rate of wear, since there are no chafing or frictional contacts present.

It is especially beneficial for the current to be supplied via an additional air gap using an inductive rotary transformer when the stator is fed three-phase current. In this case, potential energy is transmitted in a noncontacting manner via a three-phase transformer into the subassembly having the stator.

It is especially useful for the stator to be supplied with current via slip rings when the stator and rotor combination is not a three-phase motor. For example, if a two-phase alternating-current motor is used, an especially beneficial approach is for the motor to be supplied via slip rings at the other air gap.

Further advantages are derived by installing a control circuit required for driving the electric drive at the stator's axis of rotation. In this case, then, the entire power electronics for driving the electric drive, including the stator and rotor, are situated at the stator's axis of rotation. This means that the stator and power electronics are fixedly connected to one another via conventional cables. In this case, a voltage of any form at all may be transmitted from the power electronics to the stator. At the same time, at the second air gap, via which the current arrives in the subassembly connected to the stator, an inductive transformer may be employed. Its sinusoidal a.c. voltage is then converted by the power electronics mounted at the axis of the stator into the voltage required for driving the motor.

If provision is made for a wireless transmission of control signals from one control unit to the control circuit, then control signals required by the control circuit of the power electronics at the stator axis may be transmitted to the same in an especially simple manner. Thus, the power electronics of the control circuit at the axis of the stator may be easily externally supplied with the required control signals.

If the stator is directly mounted on the shaft of the driven cylinder, there is no need for an additional motor mount between the two subassemblies. The rotor is simply supported by the one subassembly, the gear train, while the other subassembly, the cylinder, constitutes the mounting for the stator.

If an additional electrical resistor is provided, then it is possible that electrical energy may be dissipated when the subassembly works regeneratively with the stator. In this case, the three-phase transformer at the air gap may then have a smaller dimensional design. In practical fashion, the electrical resistor is likewise accommodated in the subassembly of the stator and rotates along with it. If the stator basically only functions regeneratively, then the need for the three-phase transformer is also completely eliminated, since then only electrical energy is dissipated, for which purpose the additional electrical resistor suffices. Such a purely regenerative drive is frequently found in so-called braking drives which, in printing presses, ensure that no flank change occurs at the gear wheels in long gear trains.

If the stator works regeneratively, it may, of course, also be utilized for supplying voltage to further current consumers of a printing press: These may be blowers or other actuating drives, for example. Since braking drives basically work regeneratively, the electrical energy produced in the process may thus be used to supply these other consumers. Therefore, the braking drives consume no more electrical energy than that which is unavoidable due to mechanical and electrical losses.

One further advantageous embodiment provides for the electrical drive, made up of the rotor and stator, to be connected via a shared shaft to a further electromotor. The need is then completely eliminated for the additional energy transformer at the second air gap. In this case, a second motor is used in its place. Thus, one obtains a doubly-fed electrical machine. This approach is then particularly beneficial when the one drive directly drives a complete print unit, and the other drive is supposed to drive a subassembly separately therefrom.

BRIEF DESCRIPTION OF THE DRAWINGS

Further advantages are derived on the basis of figures, which are described and explained in greater detail in the following, in which.

DETAILED DESCRIPTION

Figure 1:
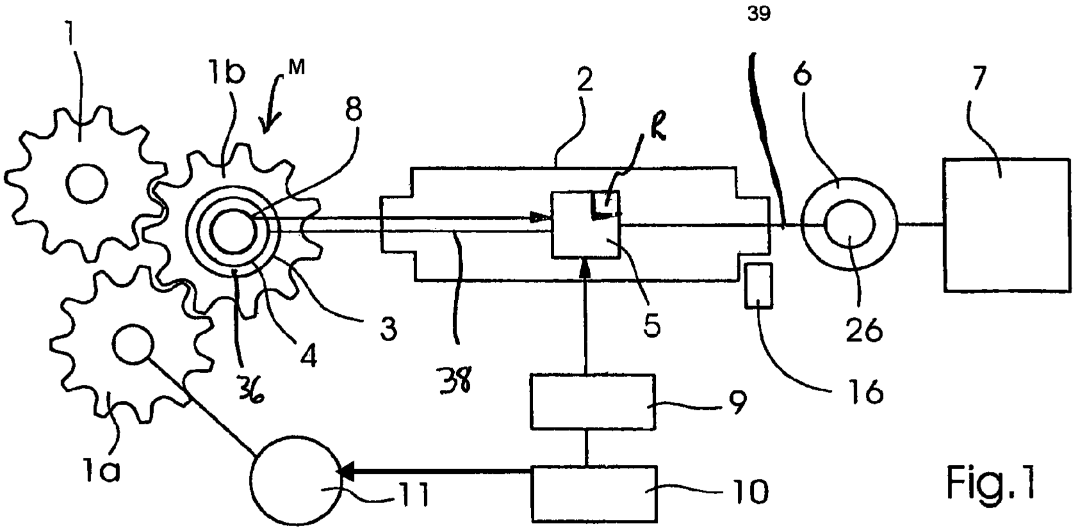
FIG. 1 shows an electrical drive which is integrated on the one side with its rotor in a gear train and, on the other side, with its stator in a cylinder.

The system according to FIG. 1 includes, on the one hand, a gear train 1, 1*a*, 1*b* and, on the other hand, a cylinder 2. Cylinder 2 may be any cylinder of a printing press. On one side, cylinder 2 is fixedly connected to a stator 4. Stator 4 is a component of a motor, which, additionally is made up of a rotor 3. Rotor 3 is fixedly connected, in turn, to a gear wheel 1*b* of the gear train. Gear wheels 1, 1*a*, 1*b* are also mounted in a manner not shown here in a frame of a printing press. Gear wheel 1*a* is driven by a further motor 11. Thus, this motor 11 is able to set the entire gear train 1, 1*a*, 1*b* in motion. Furthermore, gear wheel 1 may be followed by a further gear train which likewise may be set into rotary motion by motor 11. A brake 16 may brake cylinder 2.

To be able to supply stator 4, which is secured to cylinder 2, with current, a control circuit 5 is situated inside cylinder 2. Control circuit 5 contains a motor electronics, which renders possible a speed control or torque control of the motor made up of stator 4 and rotor 3. Control circuit 5 is a customary power electronics for driving three-phase motors and alternating-current motors. To supply the inside of cylinder 2 with current, cylinder 2 is provided on the side facing away from stator 4 with a rotary transformer 26. In this context, transformer 26 is preferably a three-phase transformer. From power-supply system 7, rotary transformer 26 feeds current, received in a contactless and only inductively coupled manner through air gap 6, to the inside of cylinder 2 in order to supply current to control circuit 5.

In addition, mounted on gear wheel 1*b* is a position sensor 8 which transmits the position of rotor 3 relative to stator 4, at all times to control circuit 5. In this way, the angular position of gear wheel 1*b* relative to cylinder 2 may be transmitted; moreover, position sensor 8 is also used for regulating the speed by control circuit 5.

The operational control of the entire system is handled via a terminal 10 where data for controlling the system may be input. These data are converted by a control unit 9 into setpoint values for speed and rotational direction which are then transmitted to control unit 5. A preferably wireless transmission is used to send the data from control unit 9 to control device 5. To achieve a compact type of construction, the rotary transformer is preferably mounted at air gap 6 inside cylinder 2. For the case that rotor 3 and stator 4 are functioning regeneratively, a resistor is placed inside cylinder 2 to enable excess electrical energy to be discharged.

The motor, made up of rotor 3 and stator 4, may be built both as an internal or also as an external-rotor drive. Furthermore, the motor may be externally mounted on cylinder 2; it may likewise be integrated in cylinder 2. From this, one derives the possible combinations, external motor as internal rotor, external motor as external rotor, internal motor as external rotor, and internal motor as internal rotor. In conjunction with the further motor 11, the following configurations are derived for subassemblies 1, 2. When the machine is at a complete standstill, both gear train 1 as well as cylinder 2 are blocked. If the intention is only for gear train 1 to rotate, cylinder 2 is blocked, and the motor, including rotor 3 and stator 4, sets gear train 1 in rotary motion. Conversely, gear train 1 is at a standstill while cylinder 2 rotates. In this case, gear train 1 is stopped, while cylinder 2 is set into rotary motion by the motor, including rotor 3 and stator 4. In normal printing operation, both gear train 1 as well as cylinder 2 rotate in the same direction of rotation. In this state, the entire system is set into motion by motor 11, while the other motor, made up of rotor 3 and stator 4, functions as a magnetic locking mechanism. Depending on the control of the two motors, in other cases cylinder 2 may rotate more slowly than gear train 1, or gear train 1 may rotate more slowly than cylinder 2. It is also possible that both motors rotate in different directions of rotation.

Figure 2:
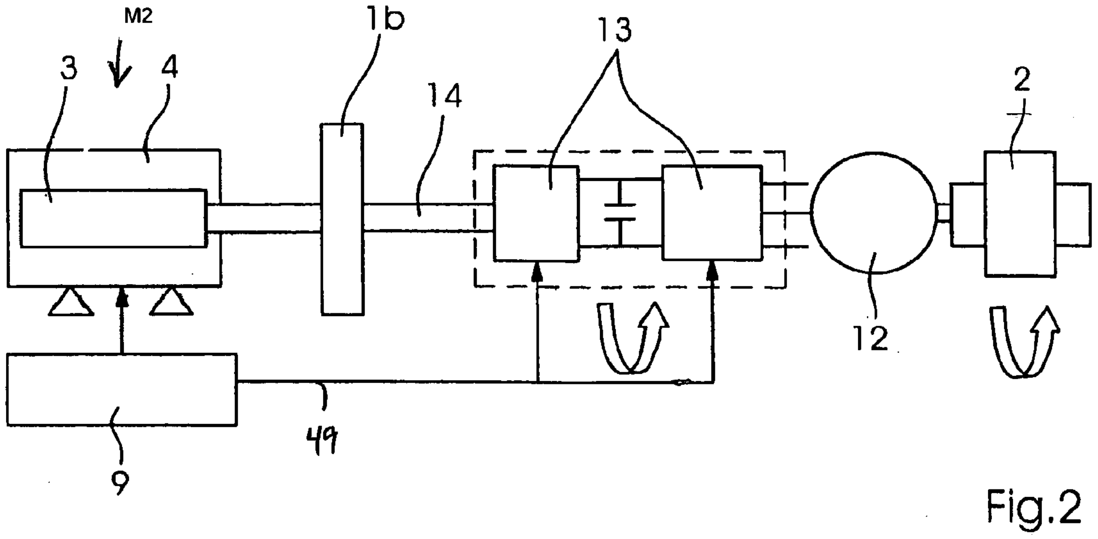
FIG. 2 shows a system, including a doubly-fed electrical machine.

Another exemplary embodiment of an electric drive according to the present invention is illustrated in FIG. 2. Here, it is a so-called doubly-fed electrical machine.

In the case of the doubly-fed electrical machine, the one motor, made up of rotor 3 and stator 4, is situated on a shared shaft 14 having an asynchronous motor 12. Also located on shaft 14 are gear train 1 (see FIG. 1) with gear wheel 1*b* and cylinder 2. Here, stator 4 is permanently mounted on the printing press and drives gear train 1. Moreover, frequency converters 13 are mounted on shaft 14. The permanently mounted motor, made up of rotor 3 and stator 4, is electrically connected via frequency converters 13 to asynchronous motor 12. Both motors are controlled via a shared control unit 9, which, via a wireless connection, controls frequency converters 13 and, via conventional cables, controls the motor made up of rotor 3 and stator 4. When frequency converters 13 work with fixed characteristics, the need is then eliminated for connecting them to the shared control unit 9. Via asynchronous motor 12, cylinder 2 may then be set in rotary motion independently of the permanently installed motor. Thus, cylinder 2 is able to rotate more quickly than shaft 14, it may rotate more slowly than shaft 14, or it may rotate in an opposite direction of rotation. Therefore, this system as well offers two degrees of freedom. If cylinder 2 is fixed, then asynchronous motor 12 likewise only drives gear train 1 and, in this manner, supports the other motor. In this manner, the motive power of both motors may be specifically matched to the individual case. Moreover, here as well, one of the two motors may function as a braking drive and, in this manner, supply electrical energy to the other motor. Thus, the energy of a motor functioning permanently as a braking motor is not fully converted into dissipation heat. At the same time, a certain redundancy in the drive is given, so that in the event one motor fails, the other motor is able to assume driving tasks.

Figure 3:
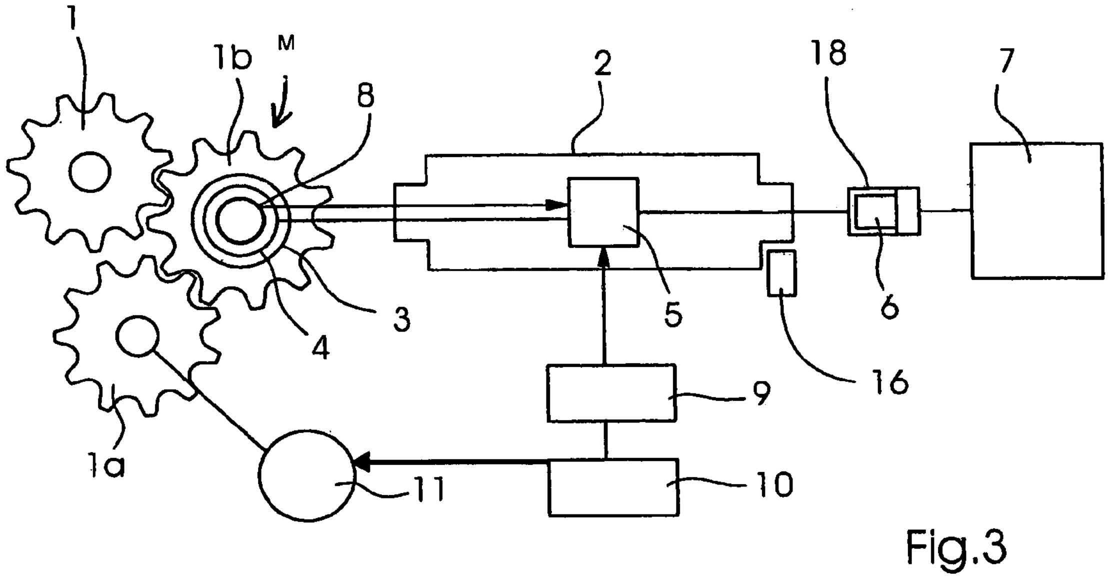
FIG. 3 shows an alternate embodiment of the FIG. 1 device with slip rings.

FIG. 3 shows an embodiment where power-supply system 7 supplies current via slip rings 18 to supply the stator 4.

REFERENCE SYMBOL LIST

1, 1*a*, 1*b* gear train
2 cylinder
3 rotor
4 stator
5 control circuit
6 air gap
7 power-supply system
8 position sensor
9 control unit
10 terminal
11 motor
12 asynchronous machine
13 frequency converters
14 shaft
16 brake
18 slip rings
26 transformer

What is claimed is:

1. An electric drive for a paper processing machine comprising:

a first freely-rotatable subassembly including a rotor;

a second freely-rotatable subassembly including a stator, the rotor and stator defining a first electromotor, the stator and the rotor being separated from one another by an air gap; and a second electromotor connected to at least one of the first and second subassemblies, the first and the second electromotor operable independently of each other, the first and second electromotors being connected via gear wheels.

2. The electric drive as recited in claim 1, wherein the second rotary assembly includes a cylinder with a shaft, the stator being directly mounted on the shaft of the cylinder, and wherein the electric drive further includes a brake for stopping the cylinder.

3. An electric drive for a paper processing machine comprising:

a first freely-rotatable subassembly including a rotor;

a second freely-rotatable subassembly including a stator, the rotor and stator defining a first electromotor, the stator and the rotor being separated from one another by an air gap;

a second electromotor connected to at least one of the first and second subassemblies, the first and the second electromotor operable independently of each other; and a control circuit for driving the electric drive, the control circuit being mounted to the second rotary subassembly.

4. The electric drive as recited in claim 3 further comprising a control unit for providing wireless transmission of control signals to the control circuit.

5. The electric drive as recited in claim 3 wherein the control circuit has an electrical resistor.

6. An electric drive for a paper processing machine comprising:

a first freely-rotatable subassembly including a rotor;

a second freely-rotatable subassembly including a stator, the rotor and stator defining a first electromotor, the stator and the rotor being separated from one another by an air gap;

a second electromotor connected to at least one of the first and second subassemblies, the first and the second electromotor operable independently of each other; and a shared shaft, the first electromotor being connected via the shared shaft to the second electromotor.

7. An electric drive for a paper processing machine comprising:

a first freely-rotatable subassembly including a rotor;

a second freely-rotatable subassembly including a stator, the rotor and stator defining a first electromotor, the stator and the rotor being separated from one another by an air gap; a second electromotor connected to at least one of the first and second subassemblies, the first and the second electromotor operable independently of each other; and at least two bilaterally energizing converters, the rotor and the stator being connected via the at least two bilaterally energizing converters to the second electromotor.

8. An electric drive for a paper processing machine comprising:

a first freely-rotatable subassembly including a rotor;

a second freely-rotatable subassembly including a stator, the rotor and stator defining a first electromotor, the stator and the rotor being separated from one another by an air gap; and a control circuit for driving the electric drive, the control circuit being mounted to the second rotary subassembly.

* * * * *

UNITED STATES PATENT AND TRADEMARK OFFICE

CERTIFICATE OF CORRECTION

PATENT NO. : 7,173,356 B2
APPLICATION NO. : 10/242197
DATED : February 6, 2007

INVENTOR(S) : Michael Krueger and Martin Riese

It is certified that error appears in the above-identified patent and that said Letters Patent is hereby corrected as shown below:

Column 2, line 10, cancel the text “(1, 2)”;
Column 2, line 12, cancel the text “(1)”;
Column 2, line 13, cancel the text “(2)”;
Column 2, line 58, cancel the text beginning with “If one of the subassemblies” to and ending “electric drive.” in column 2, line 61, and insert the following text:
--If one of the subassemblies is driven by another electric drive separate from the electromotor with the rotor and stator, which can be considered a first electric drive, then substantial benefit is derived in that an entire print unit may be driven via one single motor, namely the other electric drive.--;
Column 2, line 64, “Therefore, the electric drive” should be changed to --Therefore, the first electric drive--;
Column 2, line 66, cancel the text beginning “Besides motive assistance” to and ending “may function dynamically” in column 2, line 67, and insert the following text:
--Besides motive assistance for driving one of the subassemblies, the other electric drive however also may function dynamically--;
Column 4, lines 21 and 22, “a second motor” should be changed to --a further electromotor--;
Column 4, line 43, “The system according to Fig. 1” should be changed to --The system shown schematically according to Fig. 1--;
Column 4, lines 46 and 47, “Stator 4 is a component of a motor” should be changed to --Stator 4 is a component of a first motor M--;
Column 4, line 56, cancel the text beginning “To be able to supply” to and ending “control circuit 5” in column 5, line 2, and insert the following text:
--To be able to supply stator 4, which is secured to cylinder 2, for example on the cylinder shaft as indicated schematically by line 38, with current, a control circuit 5 is situated inside cylinder 2. Control circuit 5 contains a motor electronics, which renders possible a speed control or torque control of the motor made up of stator 4 and rotor 3 so that stator 4 when supplied with power rotates rotor 3 via an air gap 36. Control circuit 5 is a customary power electronics for driving three-phase motors and alternating-current motors. To supply the control circuit 5 at the inside of cylinder 2 with current, cylinder 2 is provided on the side facing away from stator 4 with rotary transformer 26, as shown schematically by line 39. In this context, transformer 26 is preferably a three-phase transformer. From power-supply system 7, rotary transformer 26 feeds current, received in a contactless and only inductively coupled manner through a further air gap 6, to the Inside of cylinder 2 In order to supply current to control circuit 5.--;
Column 5, line 16, “the rotary transformer is preferably mounted at air gap 6” should be changed to --the rotary transformer 26 is preferably mounted--;
Column 5, line 18, “a resistor” should be changed to --a resistor R--;
Column 5, line 20, “The motor should be changed to --The motor M--;

UNITED STATES PATENT AND TRADEMARK OFFICE

CERTIFICATE OF CORRECTION

PATENT NO. : 7,173,356 B2 
APPLICATION NO. : 10/242197
DATED : February 6, 2007
INVENTOR(S) : Michael Krueger and Martin Riese It is certified that error appears in the above-identified patent and that said Letters Patent is hereby corrected as shown below:

Column 5, line 22, “the motor” should be changed to --the motor M--;
Column 5, line 31, “the motor” should be changed to --the motor M--;
Column 5, lines 32 and 33 “rotary motion.” should be changed to --rotary motion via current supplied to the stator 4.--;
Column 5, line 33 “is” should be changed to --may be--;
Column 5, line 35, “the motor” should be changed to --the motor M--;
Column 5, line 39, “the other motor should be changed to --the motor M--;
Column 5, line 41, “the two motors” should be changed to --the two motors M, 11--;
Column 5, line 44, “both motors” should be changed to --both motors M, 11--;
Column 5, line 50, “motor” should be changed to --motor M2--;
Column 5, line 56, “motor” should be changed to --motor M2--;
Column 5, line 58, “Both motors” should be changed to --Both motors 12, M2--;
Column 5, line 61, “the motor” should be changed to --the motor M2--;
Column 5, line 66, “motor” should be changed to --motor M2--;
Column 8, lines 4 and 5, “the other motor” should be changed to --motor M2--;
Column 8, lines 5 and 6, “both motors” should be changed to --both motors 12, M2--;
Column 6, line 7, “one of the two motors” should be changed to --one of the two motors, M2 for example--;
Column 6, lines 8 and 9, “supply electrical energy to the other motor should be changed to --supply electrical energy via output 49 to the other motor 12--.

Signed and Sealed this

Fifteenth Day of May, 2007

JON W. DUDAS
*Director of the United States Patent and Trademark Office*